(12) United States Patent
Yu et al.

(10) Patent No.: US 8,382,498 B2
(45) Date of Patent: Feb. 26, 2013

(54) CARD CONNECTOR WITH EJECTOR

(75) Inventors: Jian-Fei Yu, Kunshan (CN); Feng Zhou, Kunshan (CN); Qi-Jun Zhao, Kunshan (CN)

(73) Assignee: Hon Hai Precision Ind. Co., Ltd, New Taipei (TW)

( * ) Notice: Subject to any disclaimer, the term of this patent is extended or adjusted under 35 U.S.C. 154(b) by 0 days.

(21) Appl. No.: 13/118,600

(22) Filed: May 31, 2011

(65) Prior Publication Data
US 2011/0294323 A1 Dec. 1, 2011

(30) Foreign Application Priority Data
May 31, 2010 (CN) .......................... 2010 2 0207745

(51) Int. Cl.
*H01R 13/62* (2006.01)
(52) U.S. Cl. ........................................................ 439/159
(58) Field of Classification Search .................... 439/159
See application file for complete search history.

(56) References Cited

U.S. PATENT DOCUMENTS

| | | | |
|---|---|---|---|
| 6,669,494 B2 | 12/2003 | Abe | |
| 7,086,882 B2 * | 8/2006 | Kodera et al. ................. | 439/159 |
| 7,309,245 B2 * | 12/2007 | Sadatoku et al. ............. | 439/159 |
| 7,309,258 B2 * | 12/2007 | Anzai et al. .................... | 439/630 |
| 7,318,733 B2 * | 1/2008 | Wang et al. .................... | 439/159 |
| 7,484,976 B2 * | 2/2009 | Ezaki ............................. | 439/159 |
| 7,575,452 B2 * | 8/2009 | Chikashige et al. .......... | 439/159 |
| 7,632,117 B1 * | 12/2009 | Van der Steen ............... | 439/159 |
| 7,794,249 B2 * | 9/2010 | Yu et al. ......................... | 439/159 |
| 7,896,670 B1 * | 3/2011 | Gao et al. ....................... | 439/159 |
| 7,901,225 B2 * | 3/2011 | Maruyama ..................... | 439/159 |
| 8,096,821 B2 * | 1/2012 | Zhou et al. ..................... | 439/159 |
| 2006/0172572 A1 * | 8/2006 | Matsukawa et al. .......... | 439/159 |
| 2006/0183361 A1 * | 8/2006 | Kan ................................ | 439/159 |
| 2007/0281525 A1 * | 12/2007 | Yu et al. ......................... | 439/159 |
| 2009/0035971 A1 * | 2/2009 | Tsuji .............................. | 439/159 |
| 2009/0075507 A1 * | 3/2009 | Chikashige et al. .......... | 439/159 |
| 2009/0221168 A1 * | 9/2009 | Yu et al. ......................... | 439/159 |
| 2009/0246993 A1 * | 10/2009 | Yu et al. ......................... | 439/159 |
| 2009/0253280 A1 * | 10/2009 | Yu et al. ......................... | 439/159 |
| 2011/0039433 A1 * | 2/2011 | Tsai ............................... | 439/159 |
| 2011/0159716 A1 * | 6/2011 | Zhou et al. ..................... | 439/159 |
| 2011/0189875 A1 * | 8/2011 | Yu et al. ......................... | 439/159 |
| 2011/0230072 A1 * | 9/2011 | Yu et al. ......................... | 439/159 |
| 2011/0294323 A1 * | 12/2011 | Yu et al. ......................... | 439/159 |

FOREIGN PATENT DOCUMENTS

TW M364987 9/2009

* cited by examiner

*Primary Examiner* — Ross Gushi
(74) *Attorney, Agent, or Firm* — Wei Te Chung; Ming Chieh Chang (57) ABSTRACT

A card connector includes an insulative housing defining a card receiving space, a number of contacts retained in the insulative housing, an ejector received in the insulative housing and a metal shell covering the insulative housing. The ejector includes a movable slider, a spring, and a pin member, the slider defines a heart-shaped slot, and the pin member has a positioning end being rotatablely retained to the insulative housing and a free end being slidable along the heart-shaped slot to lock the slider. A latching piece is retained to the insulative housing and has a catching portion catching the pin member and an elastic portion connecting with the catching portion. When the pin member slides, the catching portion will bring the elastic portion to deflect and provide an outward or inward force to the pin member so as to control a movement trace of the pin member.

19 Claims, 6 Drawing Sheets

CARD CONNECTOR WITH EJECTOR

BACKGROUND OF THE INVENTION

1. Field of the Invention

The present invention is generally related to a card connector, and especially to a card connector which is adapted for insertion/ejecting of a card.

2. Description of Related Art

Card connectors are widely used in variety electrical equipments for building electrical paths between the electrical equipments and electrical cards, which are used as storage devices.

U.S. Pat. No. 6,669,494 discloses a conventional card connector adapted for receiving an electrical card comprises an insulative housing defining a receiving space, a plurality of contacts received in the insulative housing, an ejector and a metal shell covering the insulative housing. The ejector comprises a slider moveable along an insertion/ejecting direction of the electrical card, a spring for providing a resilient restorable force to a pin member for control a movement of the slider. The slider is formed with an ejecting arm which protrudes into the receiving space for ejecting the electrical card. The slider has a heart-shaped slot, the pin member is in a U-shaped with two ends, one end moveably disposed in the heart-shaped slot and the other end securely locked in a hole defined on the insulative housing, The heart-shaped slot defines an initial position where the electrical card does not inserted and a final position for the pin member where the slider together with the electrical card are locked. And usually, the heart-shaped slot has steps around the initial position and the final position to make sure the pin member can continue to move toward a predestined direction.

Tai Wan Patent M364987 discloses another card connector with similar configuration, but a pin member of the card connector will elastically deform during its movement along the heart-shaped slot to control a moving direction thereof at a final position during an ejection process. However, once the pin member's restored deformation become a permanent deformation, the pin member will unable to work well.

Hence, an improved card connector is highly desired to overcome the aforementioned disadvantages of the prior art.

SUMMARY OF THE INVENTION

Accordingly, an object of the present invention is to provide a card connector which has an ejector with a pin member and a latching piece catching the pin member.

To achieve the above object, a card connector adapted for receiving a card, comprises an insulative housing defining a card receiving space, a plurality of contacts retained in the insulative housing, an ejector received in the insulative housing and a latching piece. The ejector is received in the insulative housing and comprises a movable slider defining a heart-shaped slot, a spring disposed between the insulative housing and the slider to urge the slider, a pin member. The pin member has a positioning end being rotatablely retained to the insulative housing and a free end being slidable along the heart-shaped slot to lock the slider. The latching piece has a positioning portion, a catching portion and an elastic portion connecting the positioning portion and the catching portion, the catching portion is attached to the pin member so that the elastic portion will deflect and correspondingly provide a biasing force to the pin member when the pin member slides along the heart-shaped slot.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Figure 1:
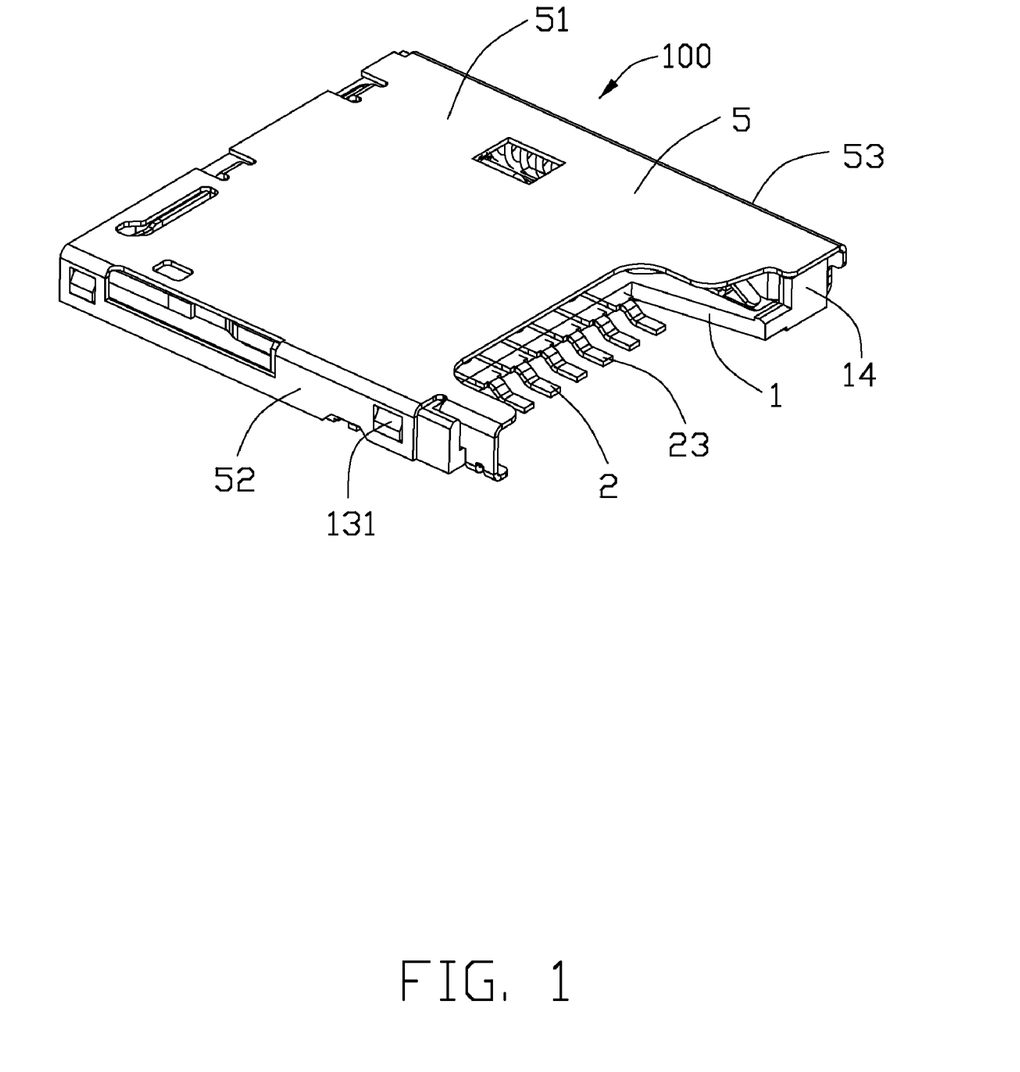
FIG. 1 is an assembled, perspective view of a card connector in accordance with the present invention.
Figure 2:
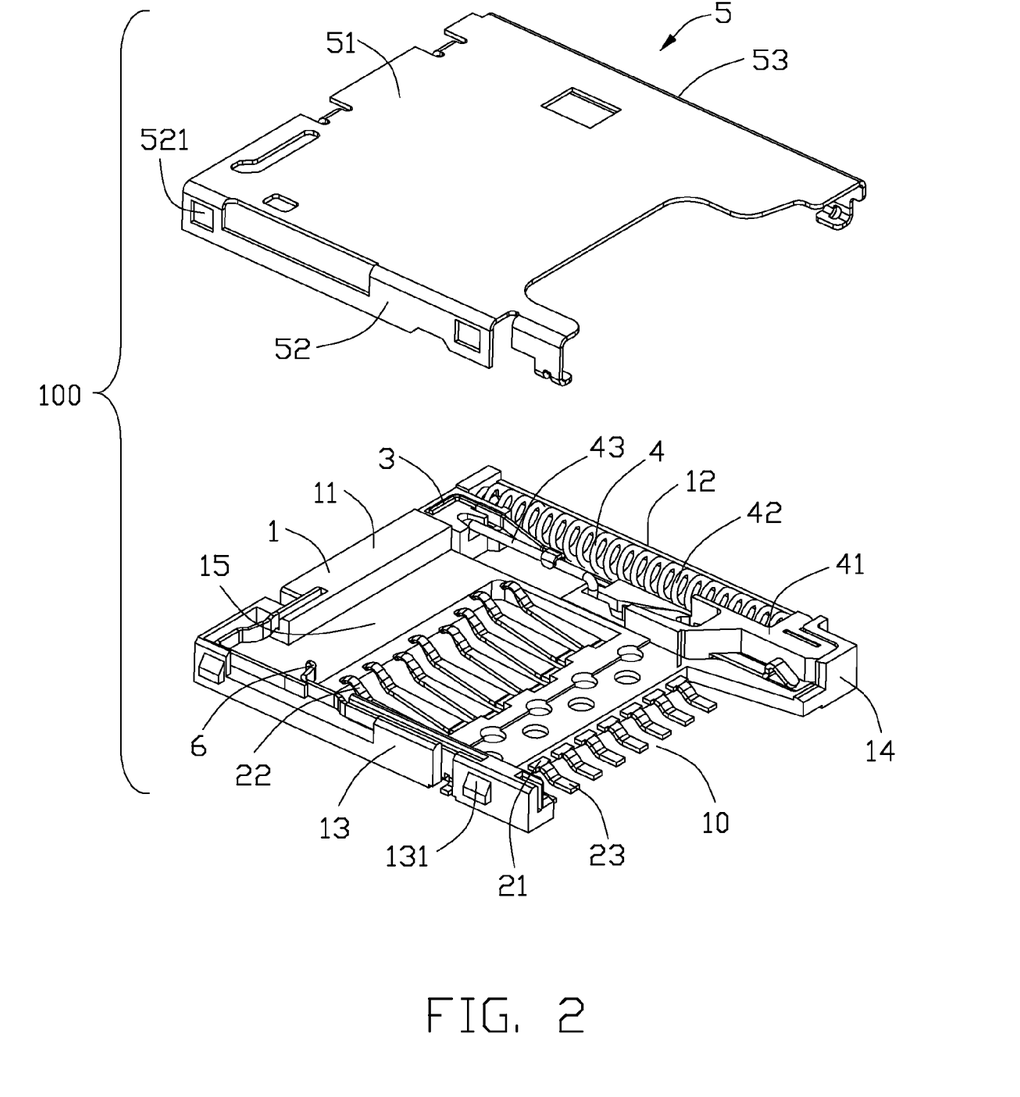
FIG. 2 is a partially assembled, perspective view of the card connector in accordance with the present invention.

Referring to FIGS. 1-2, the card connector in accordance with the present invention is adapted for receiving a card (not shown). The card connector comprises an insulative housing 1, a plurality of contacts 2 received in the insulative housing 1, a metal latching piece 3 mounted to the insulative housing 1, an ejector 4, a metal shell 5 covering the insulative housing 1, a detection contacts 6 and a locking member 7. The ejector 4 has a slider 41, a spring 42 and a pin member 43.

Figure 3:
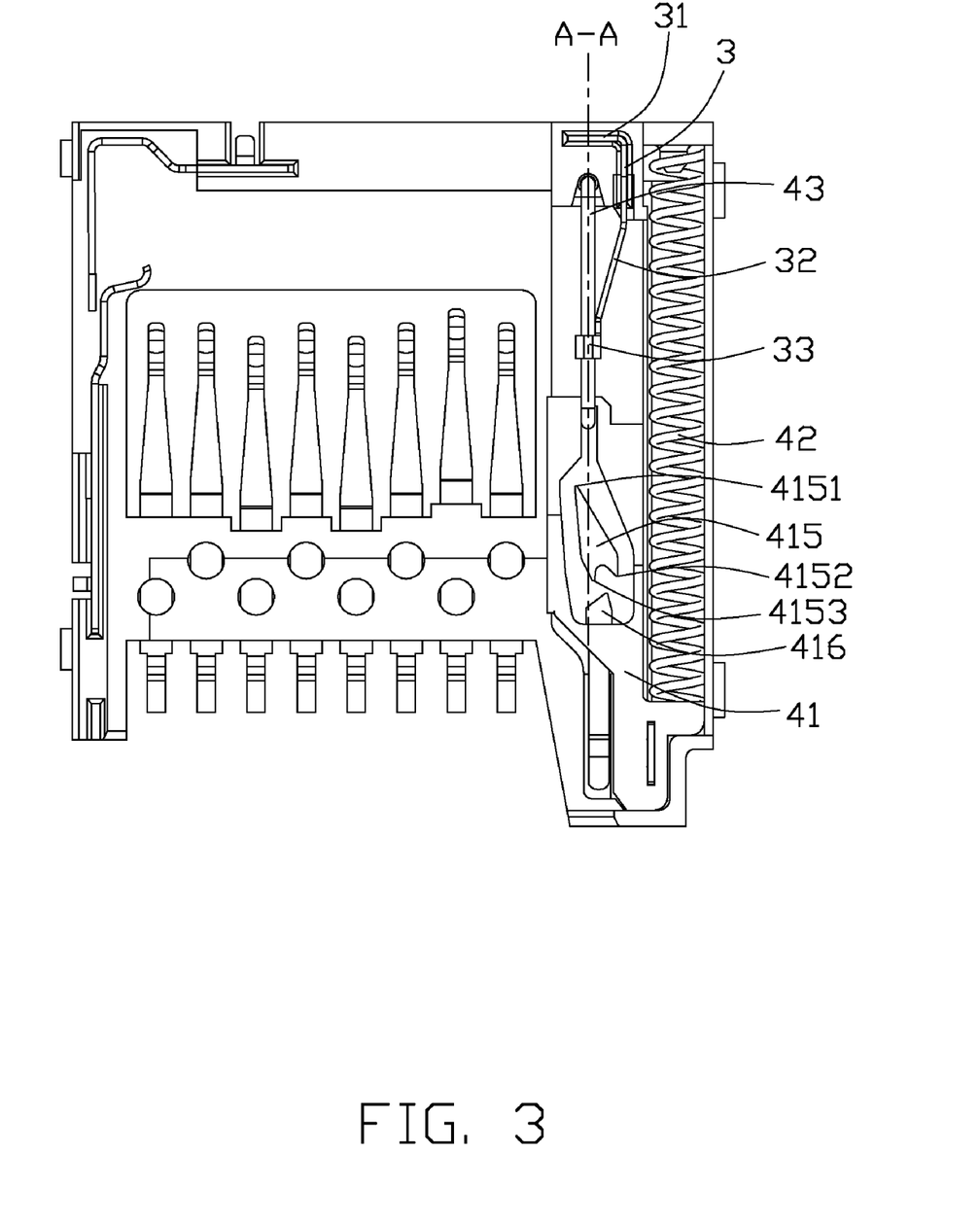
FIG. 3 is a top view of the card connector removed a metal shell thereof.
Figure 4:
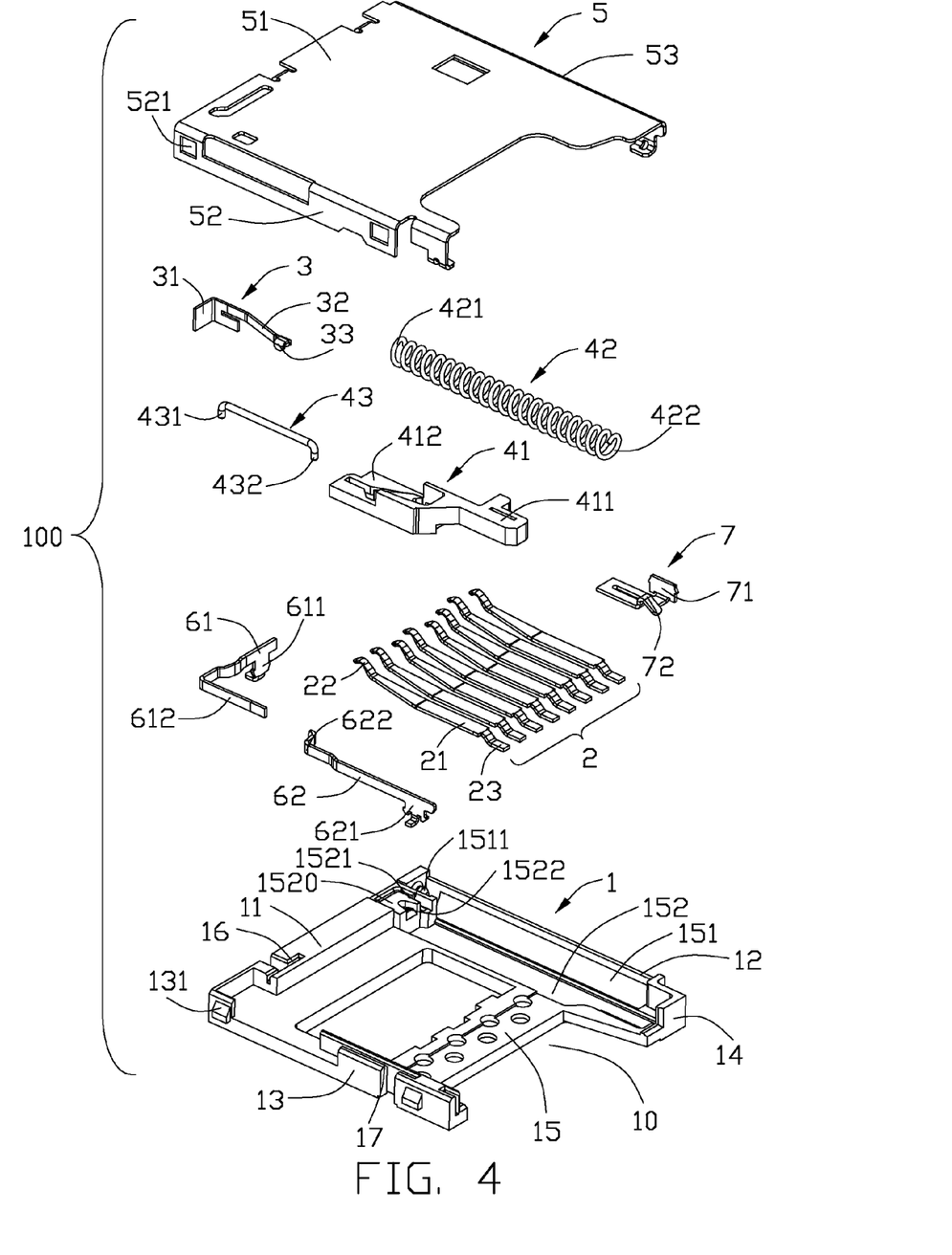
FIG. 4 is an exploded, perspective view of the card connector in accordance with the present invention.

Referring to FIGS. 2-4, the insulative housing 1 is approximately a rectangle configuration. The insulative housing 1 comprises a rear wall 11, a pair of opposite first and second sidewalls 12, 13, a front wall 14 and a bottom wall 15 connecting with the rear wall 11, the front wall 12 and the first and second sidewalls 12, 13, these walls commonly define a card receiving space 10. Each of the first and second sidewalls 12, 13 is formed with a latching portion 131 for engaging with the shell 5. The bottom wall 15 defines a first mounting slot 151 being adjacent to the first wall 12 for receiving the spring 42 of the ejector 4 and extending along a front-to-back direction, and a second mounting slot 152 located in an inner side of the first mounting slot 151 for receiving the slider 41 of the ejector 4. The first mounting slot 151 has a protruding post 1511 protruding from the rear wall 11 for positioning the spring 42. The second mounting slot 152 has a clump 1520, which includes an L-shaped positioning slot 1521 for positioning the latching piece 3 and a mounting hole 1522 for mounting the pin member 43 of the ejector 4, so the pin member 43 is rotatable in the mounting hole 1522. The protruding post 1511 is located adjacent to and at an out side of the clump 1520. The insulatvie housing 1 further defines a first assembling slot 16 and a second assembling slot 17 for positioning the detection contacts 6, on the rear wall 11 and the second wall 13, respectively.

Continuing to refer to FIGS. 2-4, each contact 2 comprises an intermediate portion 21 mounted to the bottom wall 15 of insulative housing 1, a contacting portion 23 extending rearward from an end of the intermediate portion 21 and into the receiving space 10, and a soldering portion 23 extending forwardly from the other end of the intermediate portion 21 to be soldered to a print circuit board (not shown). In this embodiment, the contacts 2 are insert-molded within the insulative housing 1 to reduce a height of the card connector, but the contacts 2 also can be assembled to the insulative housing 1 in other embodiment.

The latching piece 3 is assembled to the positioning slot 1521 of the insulative housing 1 in this embodiment, but also can be assembled to the slider 41 or provided by the shell 5 in other embodiments, the latching piece 3 is formed with a positioning portion 31 retained to the positioning slot 1521 of the insulative housing 1, a catching portion 33 for latching the pin member 43 and an elastic portion 32 extending outwardly and rearward from the catching portion 32 and connecting with the positioning portion 31. Conjoined with FIGS. 5-6, the positioning portion 31 has a first positioning portion 311 extending transversely and a second positioning portion 312 vertically connecting with the first positioning portion 311. The first positioning portion 311 is located behind the mounting hole 1522, the second positioning portion 312 is located on a right side of the mounting hole 1522. The second positioning portion 312 has a first portion 3121 and a second portion 3122 and a notch 3120 between the first portion 3121 and the second portion 3122, the first portion 3221 connects with the elastic portion 32, and the first portion 3121 and the elastic portion 32 set on an upper side and the elastic portion 32 can deform easily in virtue of the notch 3120. An angle defined between the elastic portion 32 and the pin member 43 is an acute angle, to ensure the elastic portion 32 provides a proper limiting force to the pin member 43 during an insertion/withdraw process and to make the pin member 43 moves along a predestinate moving trace.

Figure 6:
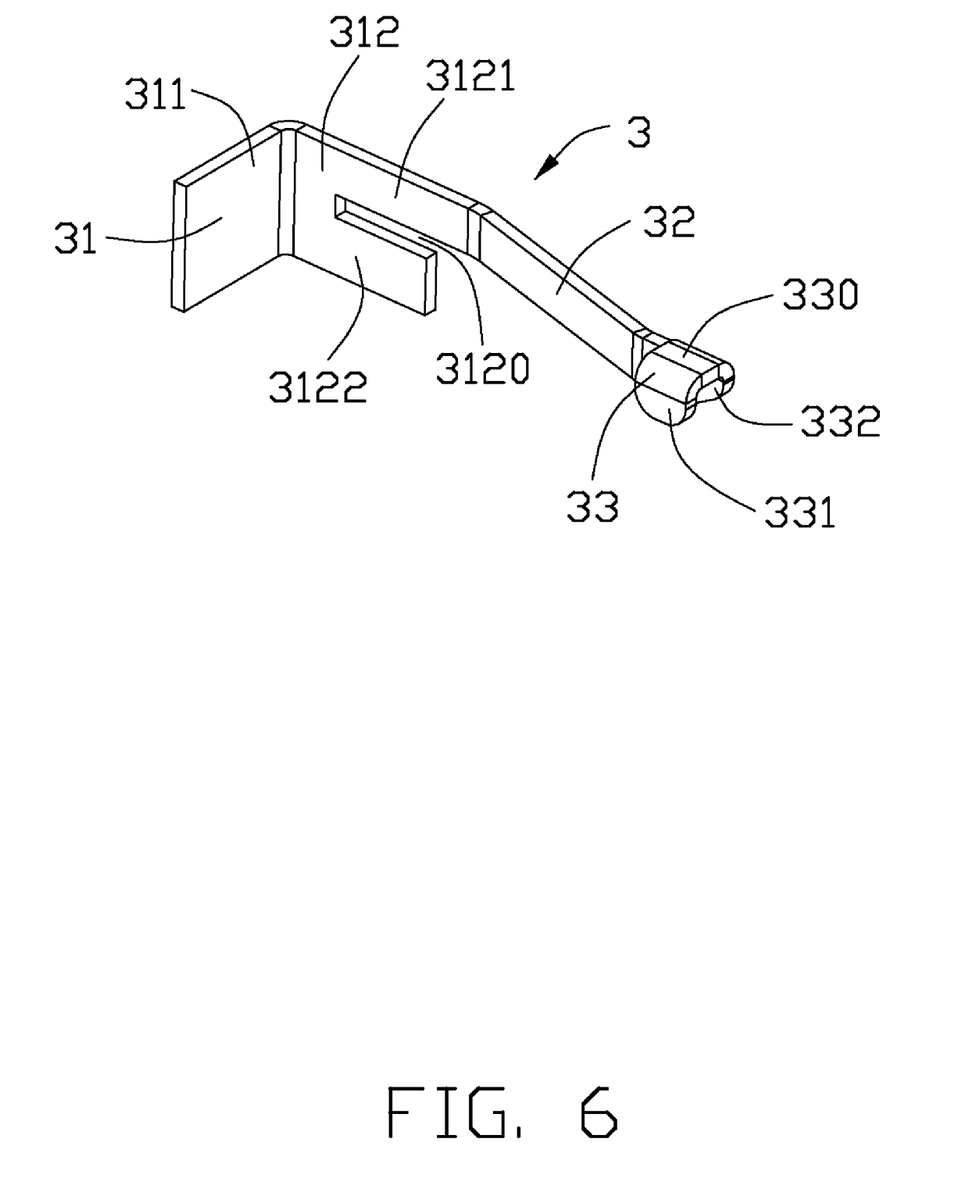
FIG. 6 is a perspective view of a latching piece of the card connector in accordance with the present invention.

The catching portion 33 has an U-shaped configuration, and surrounds the pin member 43 and defines an about 0.02 mm gap between itself and the pin member 43. The catching portion 33 has a linking portion 330 on an upper side thereof, a first clamping portion 331 and a second clamping portion 332 connecting two opposite sides of the linking portion 330, respectively, the first and the second clamping portion 331 and the linking portion 330 cooperatively define a limiting room for the pin member 43. The second clamping portion 332 links with the elastic portion 32. The catching portion 33 is attached to the pin member 43 from a top to bottom direction so as to prevent the pin member 43 from moving upwardly and even leaving the heart-shaped slot 413 defined on the slider 41 of the ejector 4.

Referring to FIGS. 2-4, the ejector 4 is used for ejecting the card out of the card connector and is mounted on the bottom wall 15 near the first sidewall 12. The ejector 4 comprises the slider 41, the spring 42 forced between the slider 41 and the insulative housing 1, and the pin member 43 sliding along the heart-shaped slot 413 of the slider 41 to position the slider 41.

Figure 5:
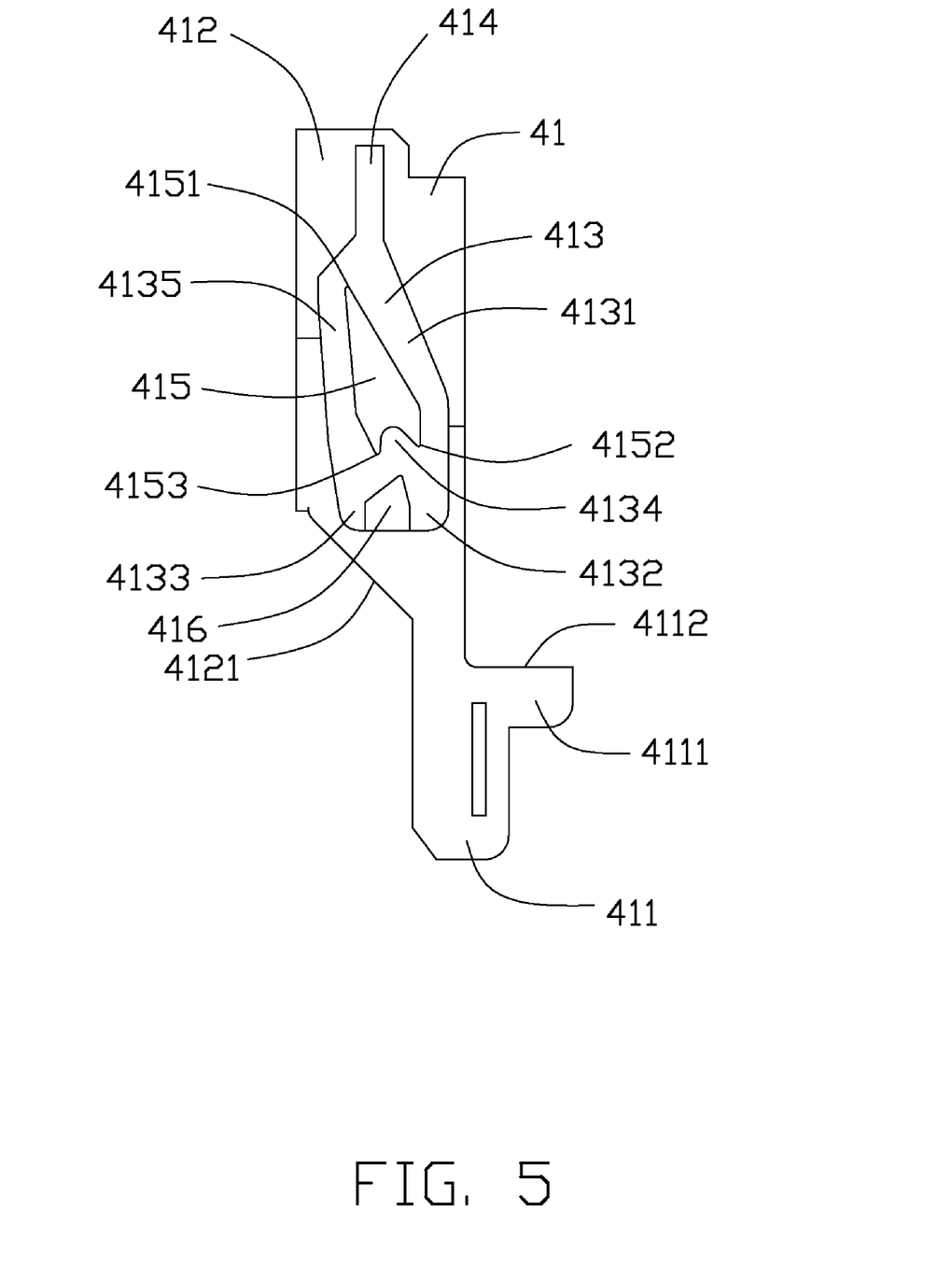
FIG. 5 is a top view of a slider of an ejector of the card connector in accordance with the present invention.

Referring to FIGS. 3-5, the slider 41 has a main body 411 extending along an insertion direction of the card and abutting against the insulative housing 1 before the card is inserted and a sliding portion 412 extending from a rear end of the main body 41 toward the receiving space 10 and being slidable along the second mounting slot 152. The main body 411 has an extending arm 4111 which extends outwardly and forms an L-shaped configuration together with the sliding portion 412, and the extending arm 4111 defines a first abutting face 4112 at a rear side thereof which connects with the main body 411 to be resisted against by the spring 42. The sliding portion 412 defines a second abutting face 4121 at a front and inner side thereof to be resisted against by the card, the inserting card resists against the second abutting face 4121 and pushes the slider 41 to move together.

The slider 41 defines the recessed heart-shaped slot 413 and a line-shaped guiding slot 414 communicating with the heart-shaped slot 413. the heart-shaped slot 413 is formed with a heart-shaped bump 415 at the center thereof, and a convex 416 at a front of the heart-shaped bump 415. the heart-shaped slot 413 has a forward guiding slot 4131 and a backward guiding slot 4135 located on two sides thereof, and a forward and a backward guiding channels 4132, 4133 on two sides of the convex 416 and a locking slot 4134 between the convex 416 and the heart-shaped bump 415. The forward guiding slot 4131, the backward guiding slot 4135, the forward guiding channel 4132 and the backward guiding channel 4133 and the locking slot 4134 cooperatively define the heart-shaped slot 413. A length of the guiding channel 4132, 4133 is shorter than that of the forward guiding slot 4131 or the backward guiding slot 4135, the forward guiding slot 4131 and the backward guiding slot 4135 intersect at a rear end of the heart-shaped bump 415 and communicate with the line-shaped guiding slot 414.

The heart-shaped bump 415 has a first intersection point 4151 at a rear end thereof, a second intersection point 4152 and a third intersection point 4153 at a front end thereof and on two sides of the locking slot 4134. The third intersection point 4135 is located in a front of the second intersection point 4152. The first intersection point 4151 is adjacent to the backward guiding slot 4135 and near the line-shaped guiding slot 414, the second intersection point 4152 is located on an out side of the locking slot 4134 and near the forward guiding channel 4132, the third intersection point 4153 is located on an inner side of the locking slot 4134 and near the backward guiding channel 4133. The heart-shaped slot 413 forms a planar bottom surface to smoothly guide the pin member 43, by such arrangement; a height of the card connector is reduced.

The spring 42 has two ends, one end 421 disposed around the protruding post 1511 and the other end 422 abutting against the first abutting face 4112 of the slider 41. The pin member 43 is in a U-shaped with a positioning end 431 and a free end 432. The positioning end 431 is securely retained in the mounting hole 1522 of the first sidewall 12 of the insulative housing 1, so that the pin member 43 is rotatable around the mounting hole 1522, and the free end 432 is moveably disposed along the heart-shaped slot 413 of the slider 41 to control the slider 41. The free end 432 of the pin member 43 is supported by the bottom face of the heart-shaped slot 413. The catching portion 33 of the latching piece 3 clamps the pin member 43 from the top to bottom direction, and controls a movement scope of the pin member 43 in virtue of the elasticity of the elastic portion 32.

Especially referring to FIG. 3, before the card inserts, the pin member 43 is located at an initial position, an axis A-A along a central axis of the pin member 43 at the initial position is defined, which is also the central axis of catching portion 32 along the sliding direction of the slider 41, the elastic portion 32 of the latching piece 3 has no deformation at this status. The first intersection point 4151 is located in an inner side of the central axis A-A, the second intersection point 4152 and the third intersection point 4153 are located in an out side of the central axis A-A. When the free end 432 of the pin member 43 moves along the heart-shaped slot 413, the catching portion 33 will deflect outwardly or inwardly and cause the elastic portion 32 to deflect and deform, so that the latching piece 3 can provide an outward or innerwar force to the pin member 43.

Referring to FIGS. 3-5, in use, the inserting card pushes the slider 41 to move rearward, the free end 432 of the pin member 43 moves from the line-shaped slot 414 to the forward guiding slot 4131, and the elastic portion 32 outwardly deflects and provides an inward force to the pin member 43 to guide the free end 432 into the forward guiding channel 4132, and the spring 42 is compressed. After the card is completely inserted and an outside force is released, the free end 432 moves through the second intersection point 4152 and into the locking slot 4134 to lock the slider 41. When ejecting the card, push the card again by an outside force again, the free end 432 moves through the third intersection point 4153 and into the rearward guiding channel 4134 by the elastic restore forces of the latching piece 3 and the outside force; then the compressed spring 32 forwardly urges the slider 41, so the free end 432 continue to move into the rearward guiding slot 4135 and slides toward the first intersection point 4151. The elastic portion 32 gradually becomes to deflect inwardly and provides an outward force to the pin member 43 to help the free end 432 move into the line-shaped slot 414, and returns to the initial position.

Referring to FIGS. 1 and 4, the metal shell 5 is stamped from a metal sheet and covers the insulative housing 1. The metal shell 5 comprises a top plate 51 and a pair of opposite a first lateral wing 52 and a second lateral wing 53. Each lateral wing 52, 53 is formed with mating holes 421 engaging with the latching portion 131 of the insulative housing 1.

The detection contacts 6 include a first detection contact 61 assembled to the first assembling slot 16 at a rear end of the insulative housing 1 and a second detection contact 62 assembled to the second assembling slot 17 at a front end of the insulative housing 1. The first detection contact 61 has a first assembling portion 611 in the first assembling slot 16 and a first detecting portion 612 connecting with the first assembling portion 611. The second detection contact 62 has a second assembling portion 621 in the second assembling slot 17 and a second detecting portion 622 connecting with the second assembling portion 621. When the card arrives to a proper position, the second detecting portion 622 of the second detection contact 62 is pushed by the card and deforms outwardly to contact with the first detecting portion 612 of the first detection contact 61. The locking member 7 has a retaining portion 71 retained to the slider 41 and a locking portion 72 connecting to the retaining portion 71 for locking the card.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector adapted for receiving a card, comprising:
    an insulative housing defining a card receiving space;
    a plurality of contacts retained in the insulative housing;
    an ejector received in the insulative housing and comprising a movable slider defining a heart-shaped slot, a spring disposed between the insulative housing and the slider to urge the slider, a pin member having a positioning end being rotatablely retained to the insulative housing and a free end being slidable along the heart-shaped slot to lock the slider; and
    a latching piece having a positioning portion, a catching portion and an elastic portion connecting the positioning portion and the catching portion, the catching portion attached to the pin member so that the elastic portion will deflect and correspondingly provide a biasing force to the pin member when the pin member slides along the heart-shaped slot.

2. The card connector as described in claim 1, wherein the positioning portion of the latching piece is assembled to the insulative housing.

3. The card connector as described in claim 2, wherein the positioning portion has a first positioning portion extending transversely and a second positioning portion vertically connecting with the first positioning portion, the insulative housing defines an L-shaped positioning slot to retain the positioning portion.

4. The card connector as described in claim 3, wherein the second positioning portion has a first portion, a second portion and a notch between the first portion and the second portion, and the first portion connects with the elastic portion.

5. The card connector as described in claim 2, wherein the catching portion has a linking portion, a first clamping portion and a second clamping portion connecting two opposite sides of the linking portion, respectively, a limiting room is defined by linking portion and the first and a second clamping portions to receive the pin member.

6. The card connector as described in claim 5, wherein the second clamping portion links with the elastic portion.

7. The card connector as described in claim 2, further comprising a shell covering the insulative housing, detection contact assembled to the insulative housing, and a locking member retained to the slider for locking the card.

8. The card connector as described in claim 1, wherein heart-shaped slot has a planar bottom surface to smoothly guide the free end of the pin member.

9. The card connector as described in claim 8, wherein the heart-shaped slot is formed with a heart-shaped bump at the center thereof and a convex, the heart-shaped slot has a forward guiding slot and a backward guiding slot located on two sides thereof, a forward and a backward guiding channels on two sides of the convex and a locking slot between the convex and the heart-shaped bump; the heart-shaped slot has a first intersection point adjacent to the backward guiding slot, a second intersection point on an out side of the locking slot and near the forward guiding channel, a third intersection point on an inner side of the locking slot and near the backward guiding channel, the first and the second intersection point are located on two opposite sides of a center axis of the catching portion.

10. The card connector as described in claim 9, wherein the third intersection point is set on a same side of the center axis as the second intersection.

11. A card connector adapted for receiving a card, comprising:
    an insulative housing defining a card receiving space;
    a plurality of contacts retained in the insulative housing;
    an ejector received in the insulative housing and comprising a movable slider defining a heart-shaped slot, a spring disposed between the insulative housing and the slider to urge the slider, a pin member having a positioning end being rotatablely retained to the insulative housing and a free end being slidable along the heart-shaped slot to lock the slider; and
    a latching piece having a positioning portion retained to the insulative housing, a catching portion surrounding the pin member and an elastic portion connecting the positioning portion and the catching portion, the catching portion moving along with the pin member and then bringing the elastic portion to deflect and provide an outward or inward force to the pin member so as to control a movement trace of the pin member.

12. The card connector as described in claim 11, wherein the heart-shaped slot has a planar bottom surface to smoothly guide the free end of the pin member.

13. The card connector as described in claim 12, wherein the positioning portion has a first positioning portion extending transversely and a second positioning portion vertically connecting with the first positioning portion, the insulative housing defines an L-shaped positioning slot to retain the positioning portion.

14. The card connector as described in claim 13, wherein the catching portion has a linking portion, a first clamping portion and a second clamping portion connecting two opposite sides of the linking portion, respectively, and the second clamping portion links with the elastic portion.

15. A card connector comprising:
   an insulative housing defining a card receiving space;
   a plurality of contacts disposed in the housing with contacting sections extending into the card receiving space;
   an ejector back and forth moveable relative to the housing in a front-to-back direction and urged by a first spring;
   a heart-shaped groove located beside the card receiving space, said heart-shaped groove defining a planar bottom face without a stepped structure thereon, said heart-shaped groove defining a starting position and a resting position with a going path and a coming path linked by two sides wherein the going path essentially refers to a deforming procedure of the first spring and the coming path essentially refers to a releasing procedure of the first spring;
   a pin member having one end pivotally mounted relative to the housing and the other end moveable along the heart-shaped groove between the staring position where the ejector is located in an outer position, and a resting position where the ejector is located in an inner position; and
   a second spring having a portion fixed relative to the housing and another portion associated with the pin member to constantly urge the pin member in a neutral position; wherein
   the heart-shaped groove is configured to guide the pin member to have the associated second spring essentially in a one side deflected manner in the going path during the deforming procedure of the first spring, and to have the associated second spring essentially in another side deflected manner in the coming path during the releasing stage of the first spring under condition that the pin member is essentially constantly in a non-deflection manner during traveling in both the going path and the coming path.

16. The card connector as claimed in claim 15, wherein the heart-shaped groove is formed in the ejector.

17. The card connector as claimed in claim 15, wherein said first spring is essentially a compression spring.

18. The card connector as claimed in claim 15, wherein the heart-shaped groove defines a far point farther than the resting position, and when the pin member reaches said far point, the second spring is essentially in a neutral manner while being forced to be in another side deflected manner during the coming path.

19. The card connector as claimed in claim 15, wherein the second spring is in a neutral manner when the pin member is located in the starting position.

* * * * *